(12) United States Patent
Kessler

(10) Patent No.: US 10,338,607 B2
(45) Date of Patent: Jul. 2, 2019

(54) UNMANNED AERIAL VEHICLE AND METHOD FOR POSITIONING AN UNMANNED AERIAL VEHICLE

(71) Applicant: Microdrones GmbH, Siegen (DE)

(72) Inventor: Christopher Kessler, Netphen (DE)

(73) Assignee: MICRODRONES GMBH, Siegen (DE)

(*) Notice: Subject to any disclaimer, the term of this patent is extended or adjusted under 35 U.S.C. 154(b) by 0 days.

(21) Appl. No.: 15/841,233

(22) Filed: Dec. 13, 2017

(65) Prior Publication Data

US 2018/0164834 A1   Jun. 14, 2018

(30) Foreign Application Priority Data

Dec. 14, 2016   (EP) .................................. 16204041

(51) Int. Cl.
| | |
|---|---|
| *G05D 1/08* | (2006.01) |
| *G01S 19/13* | (2010.01) |
| *G05D 1/10* | (2006.01) |
| *B64C 39/02* | (2006.01) |
| *G01C 21/08* | (2006.01) |
| *G01S 19/42* | (2010.01) |
| *G01S 19/49* | (2010.01) |

(52) U.S. Cl.
CPC ........... *G05D 1/101* (2013.01); *B64C 39/024* (2013.01); *G01C 21/08* (2013.01); *G01S 19/42* (2013.01); *G01S 19/49* (2013.01); *B64C 2201/024* (2013.01); *G01S 19/13* (2013.01)

(58) Field of Classification Search
None
See application file for complete search history.

(56) References Cited

U.S. PATENT DOCUMENTS

| | | | |
|---|---|---|---|
| 9,367,067 B2* | 6/2016 | Gilmore | G05D 1/101 |
| 2004/0044477 A1 | 3/2004 | Jung et al. | |
| 2008/0243372 A1* | 10/2008 | Bodin | G05D 1/0027 701/23 |
| 2014/0032021 A1* | 1/2014 | Metzler | G01S 5/0036 701/3 |
| 2015/0205301 A1* | 7/2015 | Gilmore | G05D 1/101 701/11 |
| 2017/0069214 A1* | 3/2017 | Dupray | G08G 5/0021 |
| 2017/0277180 A1* | 9/2017 | Baer | G05D 1/0038 |
| 2017/0329335 A1* | 11/2017 | DelMarco | G05D 1/02 |
| 2018/0024571 A1* | 1/2018 | Peasgood | B64C 19/00 244/7 C |

* cited by examiner

*Primary Examiner* — Thomas G Black
*Assistant Examiner* — Demetra R Smith-Stewart
(74) *Attorney, Agent, or Firm* — J. Gordon Lewis

(57) ABSTRACT

The invention relates to a method for positioning an unmanned aerial vehicle, in which the actual position (25) of the aerial vehicle differs from a desired position (26) and in which the aerial vehicle is set in a corrective motion in the direction of the desired position (26) on the basis of a first piece of directional information (27). After the beginning of the corrective motion a second piece of directional information (28) is obtained. The first piece of directional information (27) is corrected on the basis of the second piece of directional information (28). The invention moreover relates to an aerial vehicle suitable for performing the method. The invention allows a specific corrective motion in the direction of the desired position.

7 Claims, 2 Drawing Sheets

UNMANNED AERIAL VEHICLE AND METHOD FOR POSITIONING AN UNMANNED AERIAL VEHICLE

TECHNICAL FIELD

The invention relates to an apparatus and method for positioning an unmanned aerial vehicle.

SUMMARY OF THE INVENTION

The invention relates to a method for positioning an unmanned aerial vehicle (UAV) whose actual position differs from a desired position. The invention moreover relates to an unmanned aerial vehicle suitable for performing the method.

Unmanned aerial vehicles have many opportunities for use that involve a desire for the unmanned aerial vehicle to remain in a fixed prescribed position. These include, by way of example, camera shots when the aim is for a particular sequence of events to be recorded from a defined angle of vision.

For uses of this kind, the problem arises that it is not entirely simple to keep an unmanned aerial vehicle continually in one fixed position. For example, unmanned aerial vehicles are subject to regular drift under the influence of wind. The circumstance that there is a discrepancy between the actual position and the desired position can easily be derived from a piece of information about the current position.

It is not entirely simple to establish the direction in which the unmanned aerial vehicle needs to be set in motion in order to approach the desired position again. Although forming the difference can be used to obtain a piece of absolute information about the direction of the actual position in relation to the desired position from a piece of position information, it is not possible to obtain any directional information that takes into consideration the present orientation of the unmanned aerial vehicle.

The invention is based on the object of presenting an unmanned aerial vehicle and a method for positioning an unmanned aerial vehicle that are able to be used to move the unmanned aerial vehicle specifically from an actual position to a desired position. Against the background of the cited prior art, the object is achieved with the features of the independent claims. Advantageous embodiments are specified in the sub-claims.

The method according to the invention first of all involves establishing that the actual position of the aerial vehicle differs from a desired position. The unmanned aerial vehicle is set in a corrective motion in the direction of the desired position on the basis of a first piece of directional information. After the beginning of the corrective motion a second piece of directional information is obtained. The first piece of directional information is corrected on the basis of the second piece of directional information.

The method according to the invention is based on the concept of obtaining the directional information for the unmanned aerial vehicle to approach the desired position in a two-stage process. Starting from the actual position of the unmanned aerial vehicle, the corrective motion is initiated on the basis of a first piece of directional information, so that the unmanned aerial vehicle is set in motion approximately in the direction of the desired position. However, the first piece of directional information is possibly not sufficiently accurate to hit the desired position exactly. After the beginning of the corrective motion a second piece of directional information is obtained that has a higher level of accuracy. By virtue of the first piece of directional information being corrected on the basis of the second piece of directional information, it is possible to ensure that the unmanned aerial vehicle is routed precisely to the desired position with the corrective motion.

In a preferred embodiment of the invention, the actual position of the unmanned aerial vehicle is ascertained on the basis of a global positioning system (GPS) signal. GPS denotes a system in which a signal is interchanged between the unmanned aerial vehicle and one or more satellites, a unidirectional data transmission from the satellite to a GPS receiver being sufficient for position ascertainment in many cases. It is possible to consider the signal propagation time between the unmanned aerial vehicle and the respective satellite in order to obtain the position information for the unmanned aerial vehicle. The designation GPS is used as a generic term in the present patent application and is not intended to be understood as a restriction to one particular commercial provider or one particular set of satellites.

Forming the difference between the actual position and the desired position allows ascertainment of whether there is a discrepancy that requires a corrective motion. From forming the difference, it is also possible to derive an absolute piece of directional information between the actual position and the desired position. It is thus known in what direction the unmanned aerial vehicle would need to move to approach the desired position. However, this cannot be converted directly into a control command for the unmanned aerial vehicle, because the current orientation of the unmanned aerial vehicle relative to the absolute direction is not necessarily known.

The first piece of directional information may be a magnetically obtained piece of directional information. A magnetically obtained piece of directional information denotes particularly a piece of directional information derived from the earth's magnetic field. The magnetic directional information can be ascertained using a compass provided on board the unmanned aerial vehicle, for example. The magnetic directional information can be used to ascertain a direction for the beginning of the corrective motion from the actual position. Although the magnetic directional information is available independently of a movement of the unmanned aerial vehicle, the magnetic directional information is in many cases not precise enough to move the unmanned aerial vehicle exactly towards the desired position.

When the corrective motion begins, a change of position of the unmanned aerial vehicle occurs. The method according to the invention can be performed such that the second piece of directional information is derived from the change of position. The change of position can be ascertained on the basis of the GPS signal in this case.

In this embodiment, the magnetically obtained directional information is thus used to route the unmanned aerial vehicle roughly in the correct direction of movement when the corrective motion actually begins and to adapt this direction of movement on the basis of the newly gained information as the corrective motion progresses further.

The accuracy of a piece of directional information derived from a change of position becomes all the higher the larger the change of position. The method according to the invention can involve a threshold value being stipulated for the distance covered with the corrective motion, so that the direction correction is not performed before the distance has exceeded the threshold value.

The method according to the invention can involve the second piece of directional information being repeatedly recalculated in the course of the corrective motion. If the recalculated second piece of directional information differs from the previous second piece of directional information, then the previous piece of directional information can be corrected on the basis of the recalculated directional position, or can be replaced thereby. It thus becomes possible to compensate for possible interfering influences in the course of the corrective motion that are brought about by wind or by sensor noise, for example.

The direction correction can be performed such that at a particular time the first piece of directional information is replaced by the second piece or directional information. This approach allows the direction correction to lead to an abrupt change in the direction of movement of the unmanned aerial vehicle. Alternatively, a gradual transition from the first piece of directional information to the second piece of directional information may therefore be provided. This can be achieved, by way of example, by a weighting factor for the second piece of directional information, which rises continually over time from a prescribed time onwards. At the end of the corrective motion, the second piece of directional information may have replaced the first piece of directional information completely.

The accuracy of a piece of directional information derived from a change of position increases with the length of the distance covered. If the discrepancy between the actual position and the desired position is small, then the distance covered with a corrective motion is frequently insufficient to derive a sufficiently accurate piece of directional information from the change of position. The method can therefore be performed such that a correction to a first piece of directional information on the basis of a second piece of directional information is made only if the distance between the actual position and the desired position is greater than a prescribed threshold value. The threshold value may be 2 m, preferably 1 m, more preferably 0.5 m more preferably 0.2 m for example.

If the distance is less than the threshold value, then a corrective motion can be initiated on the basis of a piece of directional information that has been obtained independently of a change of position of the unmanned aerial vehicle. The directional information can be obtained in the same way or in a different way as from the first piece of directional information of the method according to the invention. The corrective motion can be used to bring the unmanned aerial vehicle closer to the actual position without a correction to the directional information being made.

The invention moreover relates to an unmanned aerial vehicle that is suitable for performing the method. The aerial vehicle comprises a direction sensor, a computation element for deriving a second piece of directional information front a change of position of the aerial vehicle and a positioning module. The positioning module provides a control unit of the unmanned aerial vehicle with a directional guideline for a corrective motion from an actual position to a desired position, wherein the corrective motion is triggered on the basis of the first piece of directional information obtained using the direction sensor and wherein the directional guideline is corrected on the basis of the second piece of directional information after the beginning of the corrective motion. The direction sensor may be a magnetic compass.

The aerial vehicle can be developed with further features that are described in the context of the method according to the invention. The method can be developed with further features that are described in the context of the unmanned aerial vehicle.

BRIEF DESCRIPTION OF THE DRAWINGS

The invention is described by way of example below using advantageous embodiments with reference to the enclosed drawings, in which.

Although the drawings represent embodiments of the present invention, the drawings are not necessarily to scale and certain features may be exaggerated in order to illustrate and explain the present invention. The exemplification set forth herein illustrates an embodiment of the invention, in one form, and such exemplifications are not to be construed as limiting the scope of the invention in any manner.

DESCRIPTION OF THE PREFERRED EMBODIMENT

Figure 1:
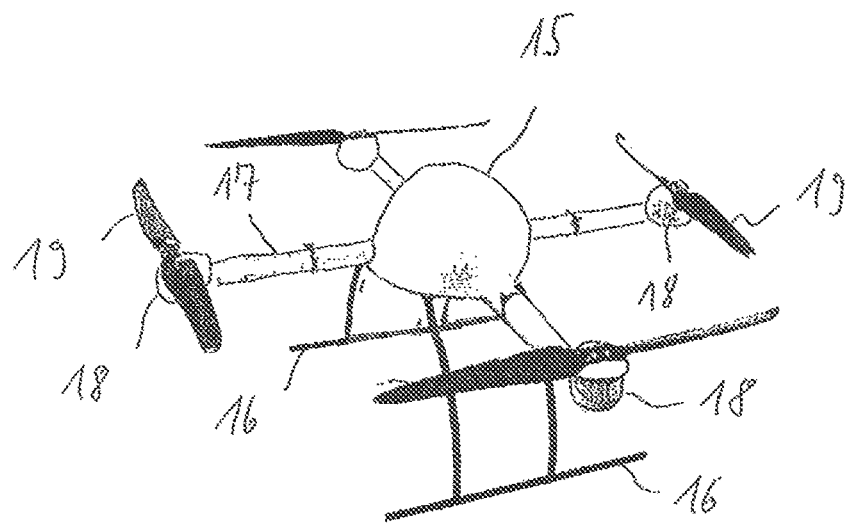
FIG. 1, shows an unmanned aerial vehicle according to the invention.

An unmanned aerial vehicle shown in FIG. 1 comprises a main body 15 with skids 16 on which the aerial vehicle stands when it is on the ground. Extending outwardly from the main body 15 are four supporting bars 17. Arranged at the outer end of each supporting bar 17 is a drive motor 18 for driving a rotor 19. To start, the rotors 19 are set in counter-rotation, so that the aerial vehicle takes off vertically upwards. Suitable actuation of the drive motors 18 allows the aerial vehicle to be controlled specifically along desired flight paths.

Figure 3:
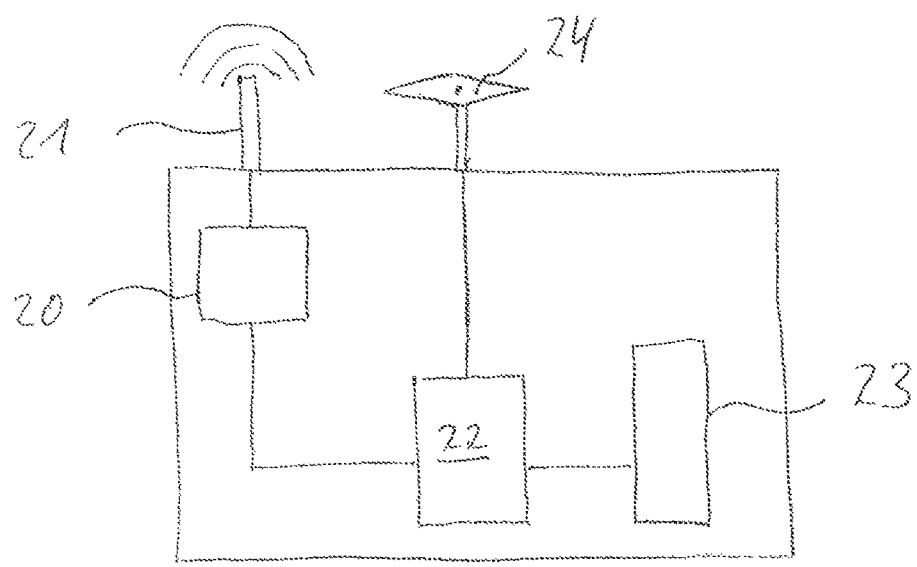
FIG. 3, shows a schematic depiction of components of the unmanned aerial vehicle.

The unmanned aerial vehicle according to FIG. 3 comprises a GPS module 20 that uses an antenna 21 to receive GPS signals from a plurality of satellites. A piece of information about the current position of the unmanned aerial vehicle is routed to a positioning module 22 forming the difference between the current position (actual position) and a previously input wanted position (desired position) in order to ascertain how great the present distance between the actual position and the desired position is. If the positioning module finds a discrepancy, then the positioning module 22 is used to trigger a corrective motion with the aim of bringing the unmanned aerial vehicle back to its desired position. For this purpose, the positioning module 22 routes a control command to a control unit 23. The control unit 23 actuates the drive motors of the unmanned aerial vehicle in the desired manner.

In particular, the positioning module 22 transmits a pieces of information to the control unit 23 regarding the direction in which the corrective motion is meant to lead. In this case, the absolute direction for the corrective motion is known from forming the difference between the actual position and the desired position. However, the absolute direction information cannot readily be converted into a control command for the control unit 23, because the present orientation of the unmanned aerial vehicle relative to the direction of movement cannot be derived from a single position ascertained using the GPS signal.

The positioning module 22 is additionally connected to a compass 24 from which the positioning module 22 receives a piece of information about the present orientation of the unmanned aerial vehicle relative to the earth's magnetic field. The directional information from the compass 24 forms a first piece of directional information within the context of the invention, from which the positioning module 22 derives a control command for the direction in which the corrective motion is begun.

So long as the distance between the actual position 25 and the desired position 26 is less than a prescribed threshold value of, by way of example, 0.5 m, exclusively the first piece of directional information obtained using the compass 24 is used in order to lead the unmanned aerial vehicle to the desired position 26. The method according to the invention, in which the first piece of directional information is corrected on the basis of a second piece of directional information, is begun only if the distance between the actual position 25 and the desired position 26 is greater than the threshold value. The correction of the directional information can be continued iteratively as the process progresses, even if the distance between the actual position 25 and the desired position 26 becomes less than the threshold value during the corrective motion.

Figure 2:
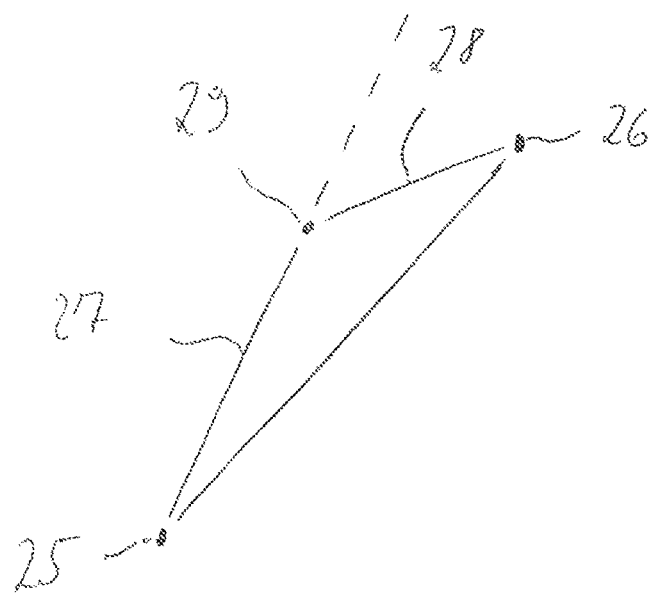
FIG. 2, shows a schematic depiction of a corrective motion of the unmanned aerial vehicle.

As depicted in FIG. 2, the first piece of directional information 27 obtained from the compass 24 does not always correspond exactly to the direction between the actual position 25 and the desired position 26 of the unmanned aerial vehicle. A corrective motion that simply follows the first piece of directional information 27 would thus route the unmanned aerial vehicle past the desired position 26. The positioning module 22 would find at a given time that the distance between the actual position and the desired position 26 increases again, and would send an opposite control command to the control unit 23. There is the risk that the unmanned aerial vehicle can get out of control as a result of control commands that become ever more extreme.

After the beginning of the corrective motion, the positioning module 22 finds that the position of the unmanned aerial vehicle changes. From the change of position, the positioning module 22 derives a second piece of directional information 28 about the direction between the current actual position and the desired position. The second piece of directional information 28 derived from the change of position generally has a higher level of precision than the first piece of directional information 27 obtained using the compass 24.

According to FIG. 2, a correction to the first piece of directional information 27 can be made at a time 29 that comes after the beginning of the corrective motion, which means that the unmanned aerial vehicle moves exactly in the direction of the desired position in a second part of the corrective motion according to the second piece of directional information 28. The second piece of directional information can be recalculated again and again in the course of the corrective motion, so that adaptation of the second piece of directional information can be performed if need be.

The method according to the invention thus presents a two-stage process for the corrective motion in the direction of the desired position 26. At a first stage, the directional guideline for the corrective motion is derived from a possibly less accurate but nevertheless always available first piece of directional information 27 that is obtained from the compass 24. At the second stage, the first piece of directional information 27 is corrected on the basis of the second piece of directional information 28, which is derived from the change of position and has a higher level of accuracy.

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

The invention claimed is:

1. A method of self-positioning an unmanned aerial vehicle comprising the steps of:

providing an unmanned aerial vehicle including a global positioning system including a GPS module and an antenna for receiving GPS signals from a plurality of satellites, said unmanned aerial vehicle further including a magnetic compass, a vehicle positioning module, a control unit and a vehicle propulsion system;

operating said global positioning system to receive and process GPS signals, to generate an actual or current position coordinate signal as a function of said GPS signals and to route the actual or current position coordinate signal to the vehicle positioning module;

operating the vehicle positioning module to compare the actual or current position coordinate signal with a previously input desired position coordinate signal, to generate a first piece of directional information as a function of the range or distance between the actual position and the desired position of the unmanned aerial vehicle when the difference there between exceeds a predetermined threshold value;

further operating the vehicle positioning module to receive a compass signal regarding the current orientation of the unmanned aerial vehicle relative to the earth's magnetic field and generating a second piece of direction information transmitted to the control unit to actuate the propulsion system for corrective motion of said unmanned aerial vehicle;

initiating a corrective motion of the unmanned aerial vehicle in the direction of the desired position as a function of a first piece of direction information intersecting the initial actual position and the desired position of the unmanned aerial vehicle; and iteratively repeating the previous method steps, characterized in that at the end of the corrective motion the first piece of directional information is completely superseded by the second piece of directional information.

2. The method according to claim 1, characterized in that the corrective motion is executed with a gradual transition between the first piece of directional information and the second piece of directional information.

3. A method of self-positioning an unmanned aerial vehicle comprising the steps of:

providing an unmanned aerial vehicle including a global positioning system including a GPS module and an antenna for receiving GPS signals from a plurality of satellites, said unmanned aerial vehicle further including a magnetic compass, a vehicle positioning module, a control unit and a vehicle propulsion system;

operating said global positioning system to receive and process GPS signals, to generate an actual or current position coordinate signal as a function of said GPS signals and to route the actual or current position coordinate signal to the vehicle positioning module;

operating the vehicle positioning module to compare the actual or current position coordinate signal with a previously input desired position coordinate signal, to generate a first piece of directional information as function of the range or distance between the actual position and the desired position of the unmanned aerial vehicle when the difference there between exceeds a predetermined threshold value;

further operating the vehicle positioning module to receive a compass signal regarding the current orientation of the unmanned aerial vehicle relative to the earth's magnetic field and generating a second piece of directional information transmitted to the control unit to actuate the propulsion system for corrective motion of said unmanned aerial vehicle;

initiating a corrective motion of the unmanned aerial vehicle in the direction of the desired position as a function of a first piece of directional information intersecting the initial actual position and the desired position of the unmanned aerial vehicle; and iteratively repeating the previous method steps, characterized in that a correction to a first piece of directional information on the basis of a second piece of directional information is made only if at the beginning of the corrective motion the distance between the actual position and the desired position is greater than a prescribed threshold value.

4. The method according to claim 3, characterized in that the threshold value is less than 2 m.

5. The method according to claim 3, characterized in that in the event of a discrepancy between the actual position and the desired position that is less than the threshold value a corrective motion is performed on the basis of a piece of directional information that is independent of a change of position of the unmanned aerial vehicle.

6. A method of self-positioning an unmanned aerial vehicle comprising the steps of:

providing an unmanned aerial vehicle including a global positioning system including a GPS module and an antenna for receiving GPS signals from a plurality of satellites, said unmanned aerial vehicle further including a magnetic compass, a vehicle positioning module, a control unit and vehicle propulsion system;

operating said global positioning system to receive and process GPS signals, to generate an actual or current position coordinate signal as a function of said GPS signals and to route the actual or current position coordinate signal to the vehicle positioning module;

operating the vehicle positioning module to compare the actual or current position coordinate signal with a previously input desired position coordinate signal, to generate a first piece of directional information as a function of the range or distance between the actual position and the desired position of the unmanned aerial vehicle when the difference there between exceeds a predetermined threshold value;

further operating the vehicle positioning module to receive a compass signal regarding the current orientation of the unmanned aerial vehicle relative to the earth's magnetic field and generating a second piece of directional information transmitted to the control unit to actuate the propulsion system for corrective motion of said unmanned aerial vehicle;

initiating a corrective motion of the unmanned aerial vehicle in the direction of the desired position as a function of a first piece of direction information intersecting the initial actual position and the desired position of the unmanned aerial vehicle; and iteratively repeating the previous method steps, wherein at the end of the corrective motion the first piece of directional information is completely superseded by the second piece of directional information.

7. A method of self-positioning an unmanned aerial vehicle comprising the steps of:

providing an unmanned aerial vehicle including a global positioning system including a GPS module and an antenna for receiving GPS signals from a plurality of satellites, said unmanned aerial vehicle further including a magnetic compass, a vehicle positioning module, a control unit and a vehicle propulsion system;

operating said global positioning system to receive and process GPS signals, to generate an actual or current position coordinate signal as a function of said GPS signals and to route the actual or current position coordinate signal to the vehicle positioning module;

operating the vehicle positioning module to compare the actual or current position coordinate signal with a previously input desired position coordinate signal, to generate a first piece of directional information as a function of the range or distance between the actual position and the desired position of the unmanned aerial vehicle when the difference there between exceeds a predetermined threshold value;

further operating the vehicle positioning module to receive a compass signal regarding the current orientation of the unmanned aerial vehicle relative to the earth's magnetic field and generating a second piece of direction information transmitted to the control unit to actuate the propulsion system for corrective motion of said unmanned aerial vehicle;

initiating a corrective motion of the unmanned aerial vehicle in the direction of the desired position as a function of a first piece of directional information intersecting the initial actual position and the desired position of the unmanned aerial vehicle; and iteratively repeating the previous method steps, wherein a correction to a first piece of directional information on the basis of a second piece of directional information is made only if at the beginning of the corrective motion the distance between the actual position and the desired position is greater than a prescribed threshold value.

* * * * *